(12) United States Patent
Yamashita et al.

(10) Patent No.: US 7,448,226 B2
(45) Date of Patent: Nov. 11, 2008

(54) REFRIGERATOR

(75) Inventors: Jun Yamashita, Osaka-Fu (JP); Yasushi Takagi, Osaka-Fu (JP); Susumu Saruta, Osaka-Fu (JP); Munehiro Horie, Osaka-Fu (JP); Tsutomu Sakuma, Osaka-Fu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 498 days.

(21) Appl. No.: 10/509,637

(22) PCT Filed: Mar. 27, 2003

(86) PCT No.: PCT/JP03/03775

§ 371 (c)(1),
(2), (4) Date: Apr. 20, 2005

(87) PCT Pub. No.: WO03/083388

PCT Pub. Date: Oct. 9, 2003

(65) Prior Publication Data

US 2005/0223722 A1    Oct. 13, 2005

(30) Foreign Application Priority Data

Mar. 29, 2002 (JP) .............................. 2002-093671
Mar. 29, 2002 (JP) .............................. 2002-093672

(51) Int. Cl.
*F25D 23/12* (2006.01)
*F25D 17/00* (2006.01)
*F25B 41/00* (2006.01)
*F25B 49/00* (2006.01)

(52) U.S. Cl. .................... 62/259.2; 62/177; 62/178; 62/208; 62/209; 62/229; 236/DIG. 9

(58) Field of Classification Search .................. 62/177, 62/178, 208, 209, 229, 259.2; 236/DIG. 9
See application file for complete search history.

(56) References Cited

U.S. PATENT DOCUMENTS

| 5,150,584 A | * | 9/1992 | Tomasov et al. | ............. 62/209 |
| 5,970,727 A | * | 10/1999 | Hiraoka et al. | ................ 62/156 |
| 6,041,608 A | * | 3/2000 | Fujiwara | ....................... 62/229 |

FOREIGN PATENT DOCUMENTS

| JP | 46-14447 | | 5/1971 |
| JP | 59-44551 | | 3/1984 |
| JP | 63-297981 | | 12/1988 |
| JP | 05087432 A | * | 4/1993 |
| JP | 07035455 | * | 2/1995 |
| JP | 7-91717 | | 4/1995 |
| JP | 8-28987 | | 2/1996 |
| JP | 10-47827 | | 2/1998 |
| JP | 11-230627 | | 8/1999 |
| JP | 2000-146319 | | 5/2000 |
| JP | 2000-292017 A | | 10/2000 |

* cited by examiner

*Primary Examiner*—Frantz F. Jules
*Assistant Examiner*—Huseyin Koca
(74) *Attorney, Agent, or Firm*—Pillsbury Winthrop Shaw Pittman, LLP

(57) ABSTRACT

A refrigerator has a refrigerating cycle sequentially connecting a compressor, a condenser, a drawing mechanism, and evaporator, an accumulator, an inlet temperature sensor and an outlet temperature sensor for detecting the temperatures of the inlet and outlet of the evaporator, and a cooling fan for cooling the compressor. When the difference between the temperature detected by the inlet temperature sensor and the temperature detected by the outlet temperature sensor is a predetermined value or more, the cooling fan is stopped.

5 Claims, 8 Drawing Sheets

REFRIGERATOR

CROSS-REFERENCE TO RELATED APPLICATIONS

This application is the National Phase of International Application No. PCT/JP03/03775, filed Mar. 27, 2003, which designated the U.S. and was published on Oct. 9, 2003 as International Publication No. WO 03/083388 A1. That application is based upon and claims the benefit of priority from Japanese Patent Application Nos. 2002-93671, filed Mar. 29, 2002 and 2002-93672, filed Mar. 29, 2002. The contents of all applications are incorporated herein by reference.

TECHNICAL FIELD

The present invention relates to a refrigerator which has a refrigerating cycle sequentially connecting a compressor, a condenser, a drawing mechanism, and an evaporator and uses a hydrocarbon cooling medium as a refrigerant.

BACKGROUND ART

In recent years, there is a worldwide increasing interest in the protection of the ozone layer and the problem of earth warming, and an improvement of refrigerants used in the refrigerating cycle of a refrigerator, an air conditioner and so on has be required. At present, most of refrigerators on sale use HFC (hydrofluorocarbon) as a refrigerant. However, the HFC cooling medium still has a high earth warming coefficient. Therefore, the use of a hydrocarbon cooling medium which is free of the destruction of the ozone layer and has a low earth warming coefficient, for example, an HC (hydrocarbon) cooling medium has been studied.

The HC cooling medium is a combustible cooling medium, so that a risk of ignition is pointed out. However, as the flow per volume thereof is larger than that of the HFC cooling medium, the necessary amount of the refrigerant charged into the refrigerating cycle may be smaller than a half of that of the HFC cooling medium. Therefore, even if the refrigerant leaks from the refrigerating cycle, there is little possibility of increasing to the ignition concentration, and in a refrigerator provided with the explosion-proof treated electrical parts, the safety thereof is high.

However, the HC cooling medium has is characteristically easily soluble into the refrigeration machine oil, for example, a mineral oil, in contrast to the solubility of an HFC cooling medium and other refrigerants in the machine oil. Therefore, a problem arises that the amount of the refrigerant circulating in the refrigerating cycle decreases. In particular, after turning on power when much refrigerant has been dissolved in the refrigeration machine oil, there is the possibility that cooling performance will be reduced.

It is generally known that at a low temperature and a high pressure, the amount of the HC cooling medium dissolved into the refrigeration machine oil increases. Therefore, when a refrigerator is installed in winter, the compressor and so on are in a low temperature state, so that even if power is turned on after the installation, the amount of refrigerant dissolved in the refrigeration machine oil is large. Moreover the temperature of the compressor cannot easily rise because the atmospheric temperature is low. Thus as the dissolved refrigerant will not be separated from the refrigeration machine oil, and particularly after power is turned on, the amount of the refrigerant circulating in the refrigerating cycle reduces, and the start-up of the initial cooling performance is extremely bad.

Furthermore, since the charged amount of HC cooling medium is small, the effect due to the dissolving into the refrigeration machine oil is high and the cooling performance is reduced. The reason is that even if the dissolved amount of HC cooling medium is the same as that of the HFC cooling medium, the charged amount of the HC cooling medium is smaller than a half of that of the HFC cooling medium, so that the reduction rate of the amount of the circulating refrigerant due to the dissolution is doubled or more, and the cooling performance is reduced according to the reduction rate.

On the other hand, an HC cooling medium has a high solubility into refrigeration machine oil at high pressure. As the pressure in the compressor is higher than that during the normal running until the pressure of the refrigerating cycle is made uniform and the pressure in the compressor is reduced after turning on power, so that the amount dissolved in the refrigeration machine oil is large and the cooling performance in this period is particularly low.

Next, conventionally, to perform cooling running of the refrigerator, a cooling fan is rotated in synchronization with the driving of the compressor for circulating the refrigerant in the refrigerating cycle so as to radiate heat from the compressor and the condenser. The reason is that the temperatures of the compressor and condenser are lowered, thus the condensation temperature of the refrigerant is lowered, and the cooling capacity is improved, and the loss due to rise of the winding temperature of a compressor motor is reduced.

On the other hand, when the air temperature is low, for example, when the temperature of the installation location of the refrigerator is 10° C. or lower, the temperature of the compressor may be excessively lowered due to the driving of the cooling fan. When the temperature of the compressor is lowered lower than required, the amount of the refrigerant dissolved in the refrigeration machine oil is increased and a so-called refrigerant sleeping phenomenon that the refrigerant does not circulate in the refrigerating cycle and the cooling performance is lowered is generated (the amount of circulating refrigerant is reduced).

As a sleeping countermeasure, an air temperature sensor for detecting the room temperature is installed respectively on the hinge portion and the operation board and when the air temperature detected by the sensors is low, the cooling fan is stopped independently of driving of the compressor, thus the compressor and the condenser are prevented from overcooling and the sleeping of refrigerant is suppressed.

However, even when the air temperature is a medium temperature that is higher than the low temperature, for example, 10° C. to 20° C., depending on the conditions of the installation location, the refrigerant sleeping phenomenon is generated, causing defective cooling.

For example, when a refrigerator is to be installed in a place at a low air temperature in winter, the refrigerator is stored before installation in a place at a low air temperature such as a warehouse, and fixed to the bed of a truck during delivery, so that the refrigerator is kept in a low temperature state. However, the installation location is heated by a heating system and is warm, so that the air temperature sensors of the installed refrigerator detect medium temperature or high temperature.

Therefore, even when the temperature around the installation location is higher than a predetermined temperature, the refrigerator body, in particular the compressor having high heat capacity is kept in a low temperature state, so that the refrigerant dissolved in the refrigeration machine oil is not circulated in the refrigerating cycle. Moreover, as the air temperature sensors detect medium temperature or high temperature, the cooling fan rotates and more excessively cools the compressor and the condenser, causing sleeping of the refrigerant.

Further, even when the room at the installation location is heated by a heating apparatus and is warm, as the warm air go up and by a draft from the door, the ambient temperature of the floor is mostly lower than the room temperature. Generally, the air temperature sensors are arranged on the upper part of the refrigerator body such as the hinge portion and the operation board, so that even if the sensors detect medium temperature or high temperature as a room temperature, the machine room may be in a low temperature state because it is positioned around the floor.

Therefore, although the compressor and the condenser are in the low temperature state, the air temperature sensors detect medium temperature or high temperature. Accordingly, the cooling fan rotates and excessively cools the compressor and the condenser, causing sleeping of the refrigerant.

On the other hand, in recent years, there is a worldwide increasing interest in the protection of the ozone layer and the problem of the earth warming. The use of a combustible cooling medium, for example, an HC (hydrocarbon) cooling medium has be studied which is free of destruction of the ozone layer and has a low earth warming coefficient compared with the conventional refrigerants, for example, R134a. For the HC refrigerant, in consideration of the cooling capacity thereof and the safety at the time of leakage, the charged amount of the refrigerant can be reduced to less than a half of that of R134a.

However, when the HC refrigerant which is to be charged in a small amount is used, if the same sleeping amount as that of R134a is generated, the ratio of the amount of the sleeping refrigerant to the total amount of the refrigerant is more than two times of the conventional ratio. Thus, even for a small amount of the sleeping refrigerant, the reduction ratio of the circulating amount of the refrigerant is enlarged, so that the cooling performance is extremely lowered.

The present invention was developed with the foregoing problems in view, and is intended to provide a refrigerator which has initial high cooling performance after turning on power even if a hydrocarbon cooling medium a small amount of which is charged and which is easily soluble in a refrigeration machine oil is used.

Also, the present invention was developed with the foregoing problems in view, and is intended to provide a refrigerator for preventing the defective cooling due to the sleeping of a refrigerant staying in a compressor and a condenser.

SUMMARY

One embodiment of this disclosure is characterized in that it has in a body of a refrigerator a refrigerating cycle sequentially connecting a compressor for varying the capacity, a condenser, a drawing mechanism, and an evaporator with a hydrocarbon cooling medium used as a refrigerant, and drives the compressor by high speed rotation for a predetermined period of time after turning on power.

According to one aspect of an embodiment, the atmospheric temperature is low and the pressure in the compressor is high, so that even if the amount of the refrigerant dissolved into the refrigeration machine oil is increased after turning on power, by high speed rotation of the compressor, the amount of heat of the motor of the compressor is increased, and the temperature inside the compressor is increased, and the pressure of the refrigerating cycle is made uniform quickly, and the pressure inside the compressor is reduced, thus the amount of the dissolved refrigerant can be reduced and the start-up of the initial cooling performance can be improved.

Further, in a refrigerator using a hydrocarbon cooling medium having high solubility, for example, an HC cooling medium, even if the amount of the charged refrigerant is reduced for the safety and the cooling performance, the amount of the refrigerant dissolved into the refrigeration machine oil can be reduced, so that a refrigerator having high cooling performance can be obtained.

Another aspect of an embodiment is characterized in that it has in a body of a refrigerator a refrigerating cycle sequentially connecting a compressor, a condenser, a drawing mechanism, and an evaporator with a hydrocarbon cooling medium used as a refrigerant, and a cooling fan for radiating heat from the compressor or the condenser, and keeps the cooling fan stopped for a predetermined period of time after turning on power.

According this disclosure, by keeping the fan stopped, the temperature of the compressor is increased quickly and the temperature inside the compressor can be increased quickly after turning on power, so that the separation of the dissolved refrigerant from the refrigeration machine oil can be promoted. In this case, when the air temperature and the temperature of the compressor and others are low in winter, the rise of the temperature of the compressor can be promoted particularly effectively.

Another aspect of an embodiment is characterized in that it has in a body of a refrigerator a refrigerating cycle sequentially connecting a compressor, a condenser, a drawing mechanism, and an evaporator, installing a selection valve on the outlet side of the condenser, arranging a bypass pipe for interconnecting the selection valve and a suction side of the compressor with a hydrocarbon cooling medium used as a refrigerant, and lets the refrigerant discharged from the condenser flow on the suction side of the compressor by operating the selection valve via the selection valve and the bypass pipe for a predetermined period of time after turning on power.

According to this disclosure, a high-temperature gas cooling medium discharged from the compressor is sucked into the compressor again, thus the temperatures of the compressor and the refrigeration machine oil can be increased quickly, so that the separation of the dissolved refrigerant in the refrigeration machine oil can be promoted after turning on power.

Another aspect of an embodiment is characterized in that it has in a body of a refrigerator a refrigerating cycle sequentially connecting a compressor, a condenser, a drawing mechanism, and an evaporator, installing an on-off valve on the outlet side of the condenser with a hydrocarbon cooling medium used as a refrigerant, and keeps the on-off valve in a closed state for a predetermined period of time after turning on power.

According to this disclosure, the on-off valve is kept in the closed state, so that as the compressor discharges the refrigerant, the pressure inside the compressor is extremely reduced. Thus the amount of the refrigerant dissolved in the refrigeration machine oil can be reduced for a short period.

An aspect of an embodiment is characterized in that it has in a body of a refrigerator a refrigerating cycle sequentially connecting a compressor for varying the capacity by controlling a DC brushless motor by power, a condenser, a drawing mechanism, and an evaporator with a hydrocarbon cooling medium used as a refrigerant, and supplies power only to the two phases of the DC brushless motor of the compressor for a predetermined period of time after turning on power, thereby keeping the DC brushless motor away from rotation.

According to this disclosure, the power is supplied only between the two phases without driving the motor of the compressor, so that the temperature of the motor rises by the resistance of the winding so as to increase the temperature inside the compressor as a heater. Thus the separation of the dissolved refrigerant in the refrigeration machine oil can be promoted after turning on power.

Further, without separately installing a heater for increasing the temperature of the compressor, the temperature can be increased by the power supply control for the motor, so that the temperature of the compressor can be increased quickly without increasing the cost.

An aspect of an embodiment is characterized in that it has a refrigerating cycle sequentially connecting a compressor, a condenser, a drawing mechanism, an evaporator, and an accumulator, an inlet temperature sensor and an outlet temperature sensor for detecting the temperatures of the inlet and outlet of the evaporator, and a cooling fan for cooling the compressor, and when a difference between the temperature detected by the inlet temperature sensor and the temperature detected by the outlet temperature sensor becomes a predetermined value or more, the cooling fan is stopped.

According to this disclosure, the cooling fan can be controlled not to operate when the refrigerant is in a sleeping state, so that the compressor and the condenser are not over-cooled and the defective cooling due to the sleeping of the refrigerant can be prevented.

An aspect of an embodiment is characterized in that it has a refrigerating cycle sequentially connecting a compressor, a condenser, a drawing mechanism, an evaporator, and an accumulator, an inlet temperature sensor and an outlet temperature sensor for detecting the temperatures of the inlet and the outlet of the evaporator, an air temperature sensor for detecting an air temperature, and a cooling fan for cooling the compressor which is controlled so as to be driven when at least the temperature detected by the air temperature sensor becomes a preset temperature or more, and when the difference between the temperature detected by the inlet temperature sensor and the temperature detected by the outlet temperature sensor becomes a predetermined value or more, the preset temperature is changed to a higher value.

According to this disclosure, when the air temperature is high, there are few refrigerant sleeping phenomena generated, even if it is judged that the refrigerant is in a sleeping state, the cooling fan can perform the normal running. Therefore, the compressor and the condenser can be effectively cooled and the cooling capacity can be improved.

Further, when the air temperature is medium, wherein there is a risk of sleeping, the cooling fan is stopped, thus the defective cooling due to the sleeping of the refrigerant can be surely prevented.

An aspect of an embodiment is characterized in that it has a refrigerating cycle sequentially connecting a compressor, a condenser, a drawing mechanism, an evaporator, and an accumulator, an air temperature sensor for detecting an air temperature, and a cooling fan for cooling the compressor which is controlled so as to be driven when at least the temperature detected by the air temperature sensor becomes a preset temperature or more, and the air temperature sensor is arranged in the neighborhood of a machine room.

According to this disclosure, even if a difference is generated between the temperatures of the upper part and the lower part of the room, an almost the same temperature as that inside the machine room can be detected. Therefore, the reliability of the cooling fan control by the air temperature sensor can be improved, and the defective cooling due to the sleeping of the refrigerant can be prevented.

An aspect of an embodiment is characterized in that a combustible cooling medium is used as a refrigerant of the refrigerating cycle, and for the combustible cooling medium to be charged in a small amount, the defective cooling due to the sleeping of the refrigerant can be prevented more effectively.

BRIEF DESCRIPTION OF DRAWINGS

Referring now to the drawings, wherein like reference numerals designate identical or corresponding parts throughout the several views, the embodiments of this invention will be described below.

BEST MODE FOR CARRYING OUT THE INVENTION

Figure 1:
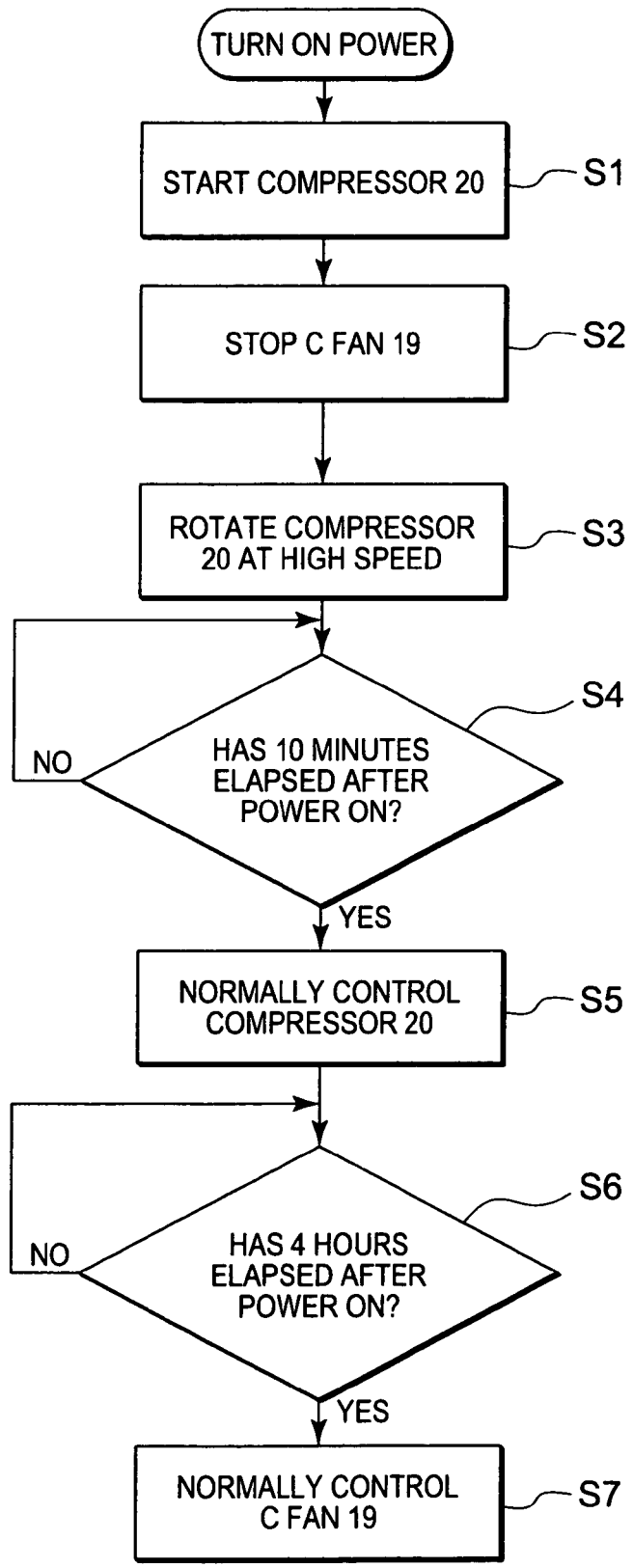
FIG. 1 is a flow chart showing an embodiment of the present invention.

Referring now to the drawings, wherein like reference numerals designate identical or corresponding parts throughout the several views, the embodiments of this invention will be described below.

Figure 2:
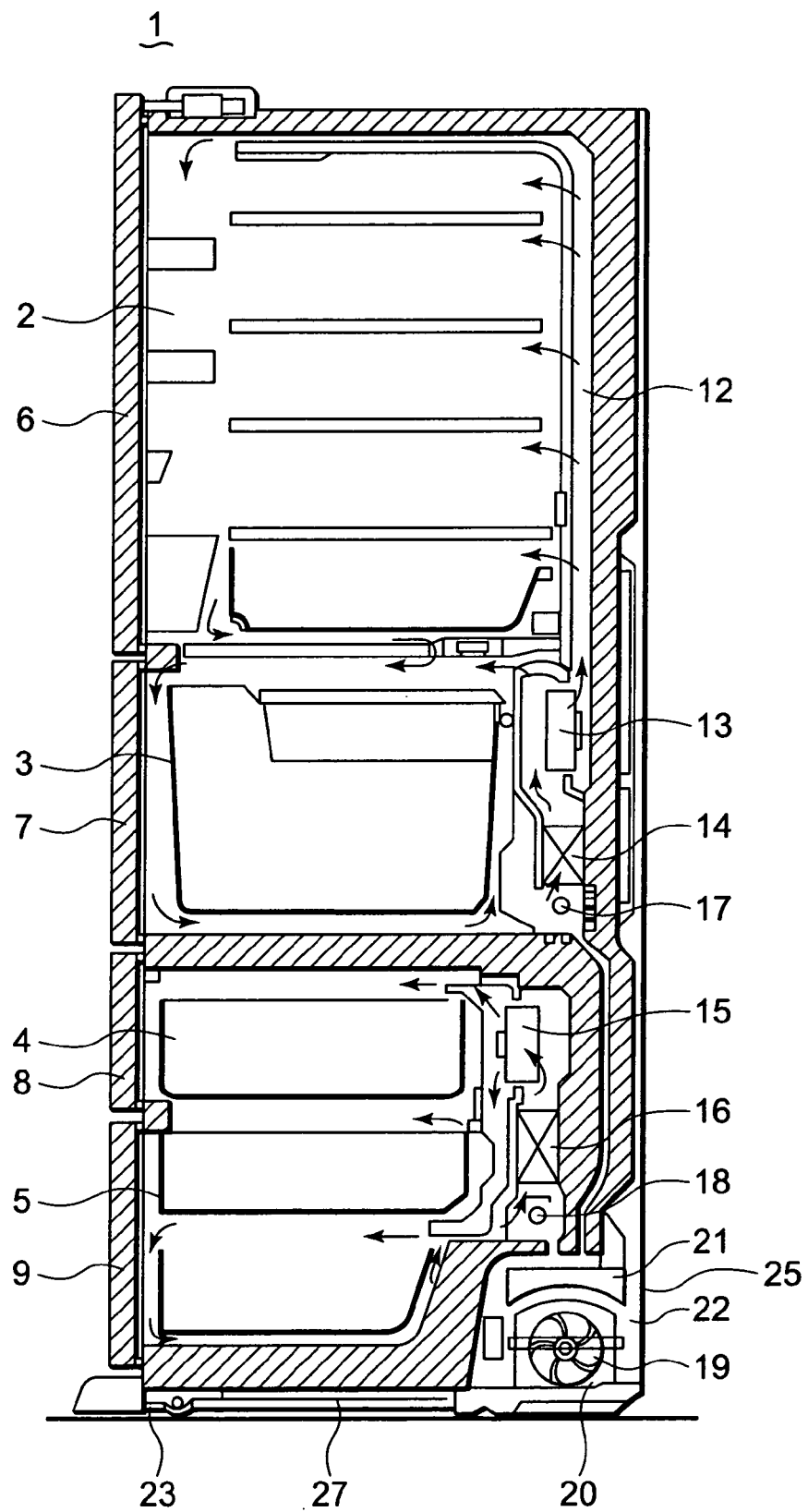
FIG. 2 is a longitudinal cross sectional view of a refrigerator body showing an embodiment of the present invention.

First, a first embodiment of the present invention will be explained hereunder with reference to the accompanying drawings. As shown in FIG. 2, in a refrigerator body 1, a cold storage chamber 2, a vegetable chamber 3, an ice making chamber 4, and a freezing chamber 5 are installed sequentially from top. In the neighborhood of the ice making chamber 4, switching chambers (not shown) for switching to each temperature zone are arranged side by side.

On the front of the cold storage chamber 2, a heat insulating door 6 of a hinge switching type is installed and on the front of each of the vegetable chamber 3, the ice making chamber 4, and the freezing chamber 5, heat insulating doors 7, 8, and 9 of a drawing type are installed.

On the rear of the vegetable chamber 3, an R evaporator 14 constituting a cooler of the cold storage chamber 2 and the vegetable chamber 3, an R fan 13 constituting a cold air circulation fan for cold storage, and an R defrosting heater 17 for removing the frost formed on the R evaporator 14 are arranged. When the R fan 13 is driven, the cold air cooled by the R evaporator 14 is supplied into the cold storage chamber 2 via a duct 12 and then circulated via the vegetable chamber 3 so as to cool the cold storage chamber 2 and the vegetable chamber 3.

On the rear of the ice making chamber 4, the switching chambers, and the freezing chamber 5, an F fan 15 constituting a cold air circulation fan for freezing, an F evaporator 16 constituting a cooler of the ice making chamber 4, the switching chambers, and the freezing chamber 5, and an F defrosting heater 18 for removing the frost formed on the F evaporator 16 are arranged sequentially from top. In this case, when the F fan 15 is driven, the cold air cooled by the F evaporator 16 is supplied and circulated in the ice making chamber 4 and the freezing chamber 5 so as to cool the ice making chamber 4 and the freezing chamber 5.

On the bottom of the refrigerator body 1, a machine room 22 is formed. A compressor 20 to be described later, a condenser 27 composed of a wire condenser, a C fan 19 for cooling the compressor 20 and the condenser 27, and an evaporating dish 21 for storing and evaporating the drain after defrosting each evaporator 14, 16 are arranged.

In front of the machine room 22, a suction port 23 for sucking air into the machine room 22 is installed, and on the rear of the machine room 22, an exhaust port 25 for exhausting air from the machine room 22 is installed. By driving the C fan 19, the fresh air is sucked into the machine room 22 from the suction port 23 so as to cool the condenser 27, and the exhaust air blown to the compressor 20 is exhausted from the exhaust port 25. Further, the C fan 19 is driven in synchronization with the compressor 20. However, when the air temperature is low, for example, 10° C. or lower, even if the compressor 20 is driven, the C fan 19 is kept in a stop state so as to prevent overcooling.

The compressor 20 is a low-pressure type reciprocal compressor driven by a DC brushless motor, which includes a DC brushless motor composed of a stator having a 3-phase winding and a rotor having a permanent magnet in the case. It executes 2-phase power supply, detects the rotational position of the rotor from an induced voltage generated in the remaining one non-power supplied phase winding and sequentially switches the 2-phase power supply, thereby rotates the motor. Further, the number of revolutions of the compressor 20 is changed by changing the voltage to be applied to the motor by PWM. In this case, the target number of revolutions can be changed according to the temperature in the refrigerator, the timing of switching of the refrigerating cycle or the defrosting. For example, when the temperature in the refrigerator is high, it is controlled to be in high speed rotation, and when the temperature in the refrigerator is low, it is controlled to be stopped or to be in low-speed rotation.

Figure 3:
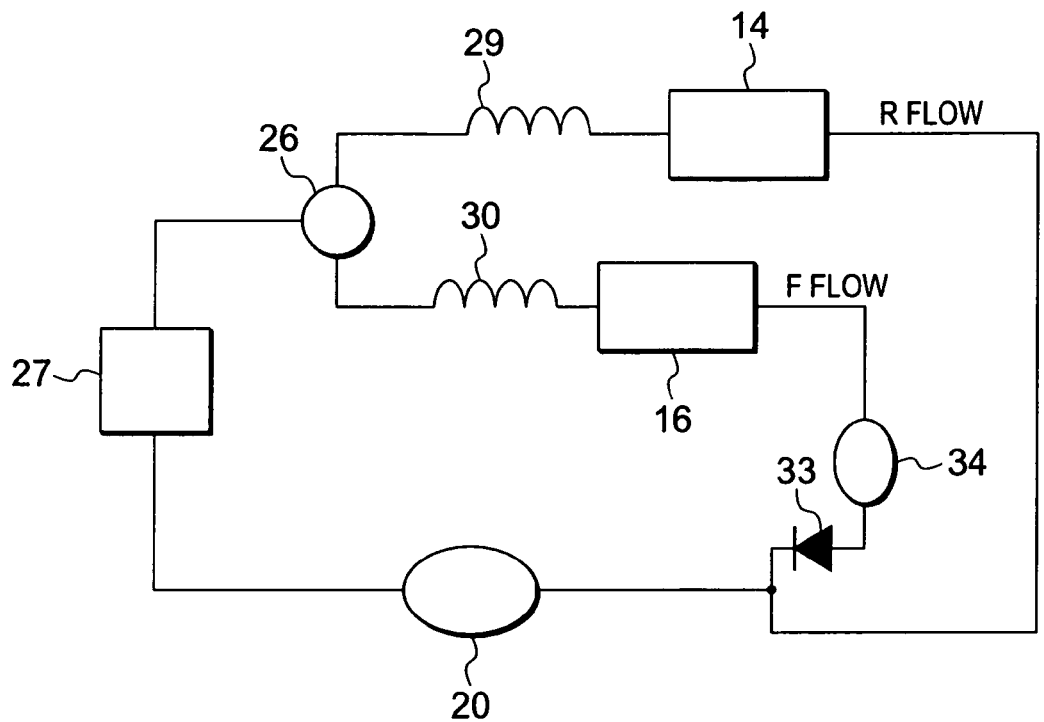
FIG. 3 is an illustration for a refrigerating cycle showing a first embodiment of the present invention.

On the other hand, as shown in FIG. 3, in the refrigerating cycle, the compressor 20, the condenser 27, and a selection valve 26 for switching the flow of the refrigerant and performing the fully closing and opening operation are connected in series. Furthermore, a first connection pipe connecting an R capillary tube 29 and the R evaporator 14 and a second connection pipe connecting an F capillary tube 30, the F evaporator 16, an accumulator 34, and a check valve 33 are connected in parallel. Here, a hydrocarbon cooling medium, for example, an HC cooling medium is used as a refrigerant.

In a case of the aforementioned constitution, by the temperature sensors for detecting the intra-chamber temperatures of each of the cold storage chamber 2 and the freezing chamber 5, an F flow for supplying the refrigerant to the second connection pipe connecting the F capillary tube 30, the F evaporator 16, the accumulator 34, and the check valve 33 and an R flow for supplying the refrigerant to the first connection pipe connecting the R capillary tube 29 and the R evaporator 14 are alternately switched by operating the selection valve 26 so as to cool the cold storage temperature zone and freezing temperature zone in the storage chambers.

Next, a control method for running the compressor and the C fan after turning on power will be explained. As shown in FIG. 1, at a Step S1, after turning on power, the compressor 20 is driven. In this case, in consideration of the safety, the compressor 20 may not be started simultaneously with turning on power, and may be driven, for example, 1 to 2 minutes later.

At a step S2, the C fan 19 is kept stopped so as to prevent it from being driven in synchronization with the start of the compressor 20. The reason is that the rise of the temperature of the compressor 20 is promoted and thereby the refrigerant dissolved in the refrigeration machine oil is separated quickly from the oil and circulated in the refrigerating cycle. The aforementioned process is effective particularly in winter when the air temperature is low and the temperature of the compressor 20 cannot be easily increased.

At a step S3, the compressor 20 is rotated at high speed. The compressor 20 may be rotated at high speed simultaneously with start. However, the pressure difference between in the refrigerating cycle and in the compressor 20 is large and the load applied to the compressor 20 is large. Therefore, the compressor 20 may be operated at low speed for 2 or 3 minutes after the start so that the pressure difference between in the refrigerating cycle and in the compressor 20 is reduced, and then is rotated at high speed.

And, at a step S4, it is judged whether a predetermined period of time, for example, a time of 10 minutes elapsed after the power is turned on. When the time of 10 minutes did not elapse, the temperature of the compressor 20 is regarded as low. When the time of 10 minutes elapsed, it is regarded that the temperature of the compressor 20 is increased and the pressure in the compressor 20 is reduced, thus the amount of refrigerant dissolved in the refrigeration machine oil is reduced, and the process goes to a step S5 and moves to the normal running of the compressor 20. At this time, when the temperature in the refrigerator is high and high speed rotation is requested to the compressor 20, the compressor 20 continues high speed rotation.

At a step S6, it is judged whether a predetermined period of time of 4 to 6 hours elapsed after the power is turned on. When the time elapsed, the process goes to a step S7 and switches the C fan 19 to the normal running. The reason of keeping the C fan 19 stopped for the predetermined period of time is that for 4 to 6 hours after starting at a low air temperature, even if the temperature of the compressor 20 is increased, the compressor 20 and the condenser 27 are overcooled by driving of the C fan 19, and the refrigerant dissolved in the refrigeration machine oil is not separated, so that it does not circulate in the refrigerating cycle and the cooling performance is lowered.

As explained above, by use of the constitution of the present invention, by rotating the compressor at high speed for a predetermined period of time after the power is turned on, even if the amount of the refrigerant dissolved in the refrigeration machine oil is large after the power is turned on, the amount of heat generated in the motor of the compressor is increased, and the temperature inside the compressor is increased, and the pressure in the refrigerating cycle is made uniform quickly, and the pressure inside the compressor is reduced. Thus the mount of refrigerant dissolved in the refrigeration machine oil can be reduced and cooling performance at the start-up can be improved.

Further, even when a hydrocarbon cooling medium having high solubility into refrigeration machine oil, for example, an HC cooling medium is used as a refrigerant charged in the refrigerating cycle, the amount of the dissolved refrigerant can be reduced. So that the reduction rate of the circulating refrigerant due to the dissolution can be improved greatly, thus the charged amount thereof which is needed for cooling performance can be reduced for safety too.

On the other hand, since the C fan is stopped for a predetermined period of time after the power is turned on, the rise of the temperature in the compressor is promoted, and the amount of the refrigerant dissolved in the refrigeration machine oil can be reduced quickly. Furthermore the C fan is kept stopped without overcooling the compressor and others, so that the energy conservation running can be realized for the C fan.

Next, another control operation of the present invention will be explained. When the power is turned on, the compressor 2 is operated at low speed, and the selection valve 26 is switched to "full closing" and the flow of the refrigerant in the refrigerating cycle is cut off.

In this case, refrigerant gas discharged from the compressor 20 stays between the discharge side of the compressor 20 and the selection valve 26. Inversely, between the suction side of the compressor 20 and the selection valve 26, the refrigerant gas in the pipe is sucked in and discharged from the compressor 20, so that the pressure inside the compressor 20 is lowered. Therefore, the refrigerant dissolved in the refrigeration machine oil is separated from the refrigeration machine oil and discharged into the refrigerating cycle because the pressure inside the compressor 20 is low.

And, when a predetermined period of time required for the reduction of the amount of the refrigerant dissolved in the refrigeration machine oil, such as 3 minutes in this case, elapses, the selection valve 26 is switched to the F flow and the normal cooling running is started.

By use of such a constitution, for a predetermined period of time after turning on power, a part of the pipes of the refrigerating cycle is cut off and the compressor is rotated and the pressure inside the compressor is reduced in a short time, thereby it is possible to reduce rapidly the amount of the refrigerant dissolved in the refrigeration machine oil. Thus the amount of circulating refrigerant can be increased after starting the normal cooling running, so that the cooling performance at the start-up can be improved.

Further, still another compressor power supply control after turning on power will be explained. The compressor 20 is generally rotated by sequentially switching power supply between the 2 phases of the DC brushless motor. However, the power supply is not switched for a predetermined period of time, from turning on power till the time when the temperature in the compressor rises, for example, 10 minutes and power is supplied only between the fixed 2 phases. In this case, the power supply is not switched, so that the DC brushless motor is not rotated and kept in a stop state. However, the power is continuously supplied, so that the DC brushless motor itself is heated by the resistance of the winding and the temperatures of the refrigeration machine oil and the compressor 20 are increased.

Therefore, when the compressor 20 cannot be started instantaneously immediately after turning on power due to the relation of the pressure inside the refrigerating cycle, by use of the motor in place of the heater, the temperatures of the refrigeration machine oil and the compressor 20 can be increased quickly and the amount of the refrigerant dissolved in the refrigeration machine oil can be reduced remarkably. Further, there is no need to separately install a heater for increasing the temperature, so that the refrigerator can be manufactured at a low price.

Further, during the rotation of the compressor 20, by changing the timing of the switching and the pulse width so as to increase the loss of inter 2 phases power supply switching in a constant cycle, the heat energy due to loss is increased and the temperatures of the refrigeration machine oil and the compressor 20 can be increased.

Figure 4:
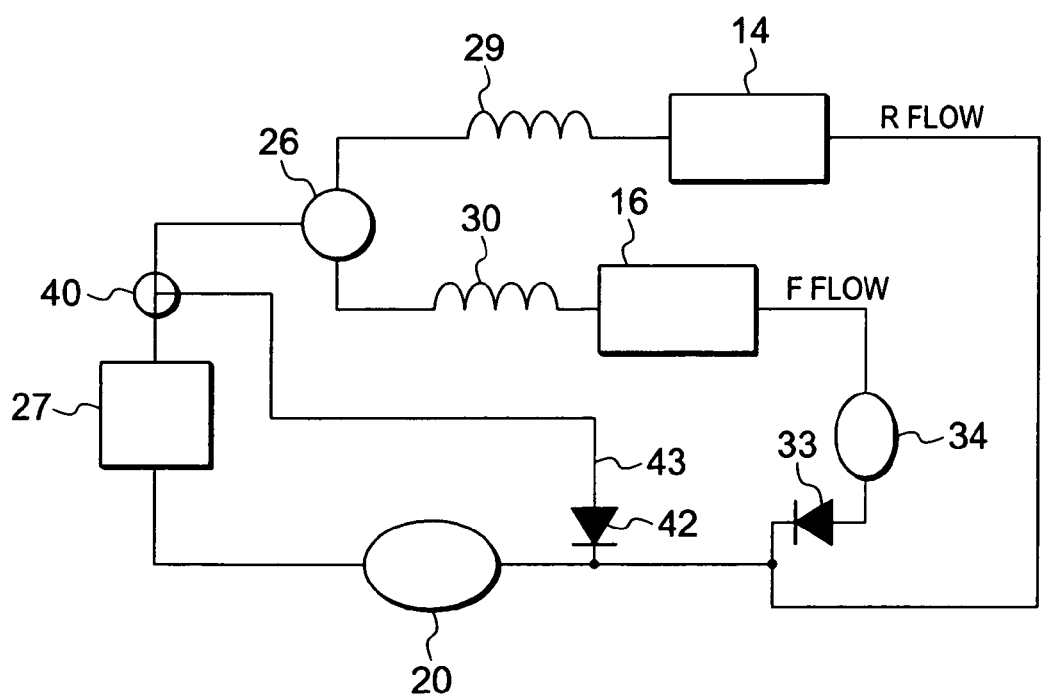
FIG. 4 is an illustration for a refrigerating cycle showing a second embodiment of the present invention.

Next, a second embodiment will be explained. FIG. 4 is an illustration showing another refrigerating cycle constitution that a bypass pipe for interconnecting the discharge side of the condenser and the suction side of the compressor is arranged. Between the discharge side of the condenser 27 and the selection valve 26, a three-way valve 40 is arranged. Another one side of the three-way valve 40 is connected to a bypass pipe 43 interconnecting to the pipe on the suction side of the compressor 20. Further, in the neighborhood of the connection with the suction pipe, a check valve 42 is arranged so as to prevent the refrigerant from back flowing in the bypass pipe 43. The check valve 42 may be an on-off valve for cutting off the refrigerant flow.

The flow of the refrigerant in the refrigerating cycle, after turning on power, is controlled so as to let the refrigerant discharged from the condenser 27 flow to the bypass pipe 43 and return it to the suction side of the compressor 20 by the operation of the three-way valve 40. At this time, the refrigerant sucked into the compressor 20 is a high temperature gas, and the high temperature gas increases the temperatures of the compressor 20 and the refrigeration machine oil.

And, when a predetermined period of time, for example, a time of 10 minutes elapsed, accompanied with the rise of the temperatures in the compressor 20 and the refrigeration machine oil, the refrigerant dissolved in the refrigeration machine oil is separated and circulated in the refrigerating cycle. Then the three-way valve 40 is operated so that the flow to the bypass pipe 43 is cut off and the refrigerant flows to each evaporator, and the normal cooling running is performed.

By use of the aforementioned constitution like this, after the power is turned on, a high temperature refrigerant discharged from the condenser is sucked in the compressor. Thus the temperatures in the compressor and the refrigeration machine oil can be increased quickly, so that the amount of the refrigerant dissolved in the refrigeration machine oil can be reduced remarkably. Therefore the cooling performance at the start-up time can be improved. Further, in the above description, it is explained that the three-way valve 40 and the selection valve 26 are as separate parts. However, an integratedly formed part, such as a four-way valve may be used.

Although the constitution of the present invention is explained above, the optimum value of a predetermined period of time required for the temperature rise or the pressure reduction of the compressor varies with the constitution, the ability, and the capacity of the refrigerating cycle and the air temperature, so that needless to say, a suitable predetermined period of time is set when necessary.

Next, other embodiments of the present invention will be explained hereunder with reference to the accompanying drawings.

Figure 7:
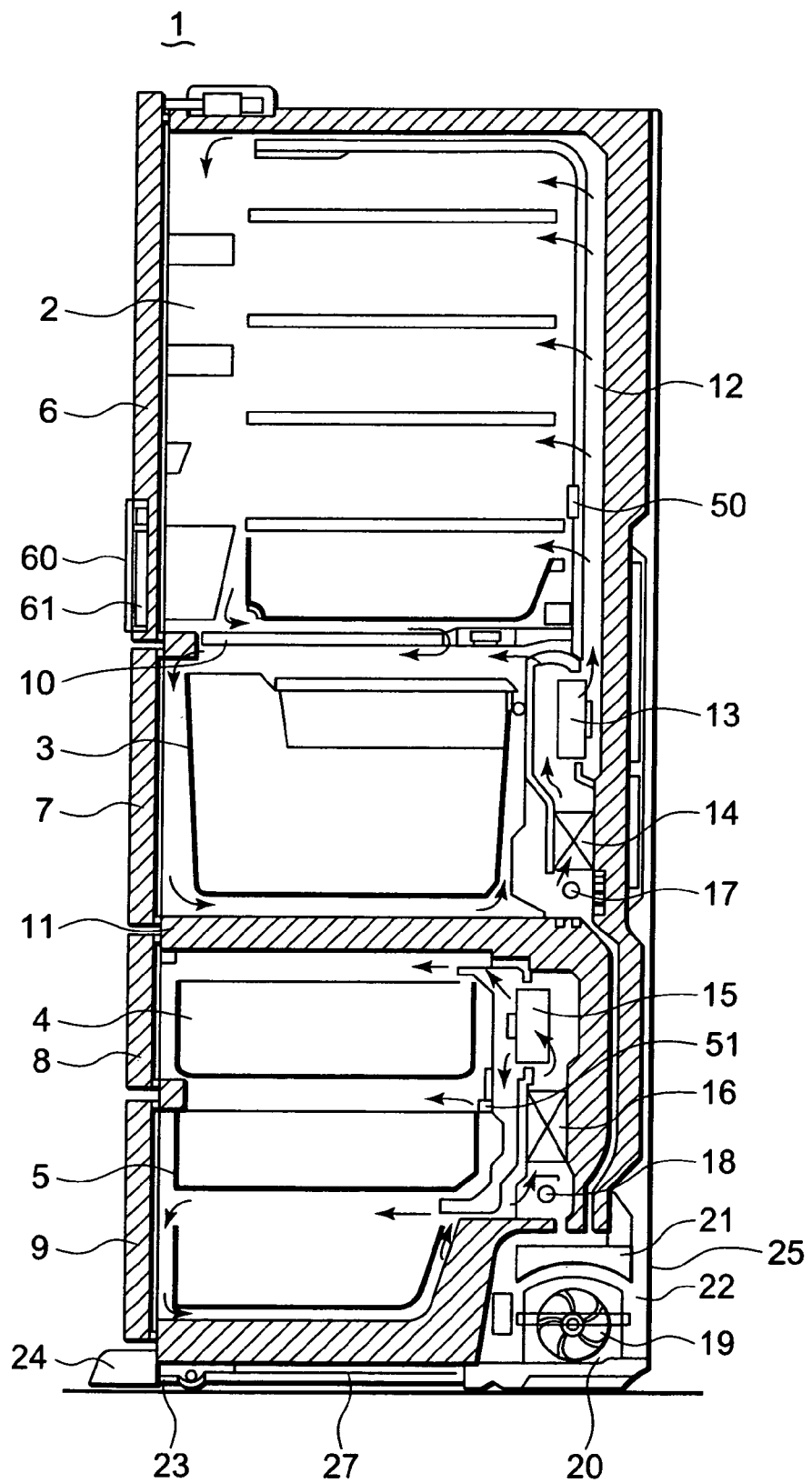
FIG. 7 is a longitudinal cross sectional view of a refrigerator body showing an embodiment of the present invention.

As shown in FIG. 7, in the refrigerator body 1, the cold storage chamber 2, the vegetable chamber 3, the ice making chamber 4, and the freezing chamber 5 are installed sequentially from top. In the neighborhood of the ice making chamber 4, switching chambers for switching to each temperature zone are arranged side by side.

Further, on the front of the cold storage chamber 2, the heat insulating door 6 of a hinge switching type is installed, and on the front of the door 6, an operation panel 60 for adjusting the temperature in the refrigerator, for switching the cooling running and for displaying is provided.

On the front of each of the vegetable chamber 3, the ice making chamber 4, and the freezing chamber 5, the heat insulating doors 7, 8, and 9 of a drawing type are installed. The cold storage chamber 2 and the vegetable chamber 3 are separated by a plastic separation plate 10. The vegetable chamber 3 and the ice making chamber 4 and the switching chambers are separated by a heat insulating separation wall 11 so as to make the flow of cold air independent. Further, the ice making chamber 4 and the switching chambers are also separated by a heat insulating separation wall.

On the rear of the vegetable chamber 3, the R evaporator 14 constituting the cooler of the cold storage chamber 2 and the vegetable chamber 3, the R fan 13 constituting the cold air circulation fan for cold storage, and the R defrosting heater 17 for removing the frost formed on the R evaporator 14 are arranged. When the R fan 13 is driven, the cold air cooled by the R evaporator 14 is supplied into the cold storage chamber 2 via the duct 12 and then circulated via the vegetable chamber 3 so as to cool the cold storage chamber 2 and the vegetable chamber 3.

On the rear of the ice making chamber 4, the switching chambers, and the freezing chamber 5, the F fan 15 constituting the cold air circulation fan for freezing, the F evaporator 16 constituting the cooler of the ice making chamber 4, the switching chambers, and the freezing chamber 5, and the F defrosting heater 18 for removing the frost formed on the F evaporator 16 are arranged sequentially from top. In this case, when the F fan 15 is driven, the cold air cooled by the F evaporator 16 is supplied and circulated in the ice making chamber 4 and the freezing chamber 5 so as to cool the ice making chamber 4 and the freezing chamber 5.

On the bottom of the refrigerator body 1, the machine room 22 is formed. In the machine room 22, the compressor 20, the condenser 27 composed of the wire condenser, the C fan 19 for cooling the compressor 20 and the condenser 27, and the evaporating dish 21 for storing and evaporating the drain after defrosting each evaporator 14, 16 are arranged.

Figure 9:
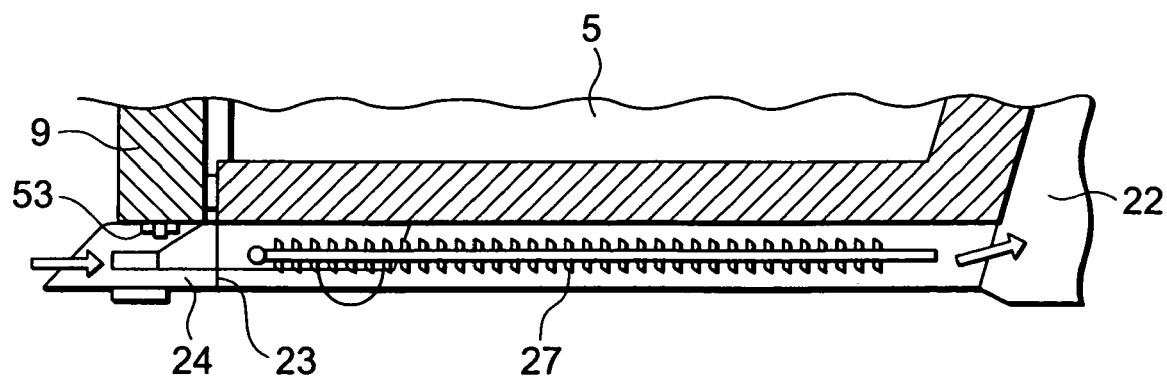
FIG. 9 is an enlarged longitudinal cross sectional view of a machine room showing the mounting position of an air temperature sensor according to the present invention.

In front of the machine room 22, the suction port 23 for sucking air in the machine room 22 is installed. As shown in FIG. 9, a cover 24 is mounted so as to intentionally block the suction port 23. On the rear of the cover 24, an air temperature sensor 53 for detecting an air temperature is mounted.

Further, on the rear of the machine room 22, the exhaust port 25 for exhausting air from the machine room 22 is installed. By driving the C fan 19, the fresh air is sucked from the suction port 23, cools the condenser 27, is introduced into the machine room 22, is heat-exchanged by the compressor 20, and then is exhausted from the exhaust port 25.

Figure 8:
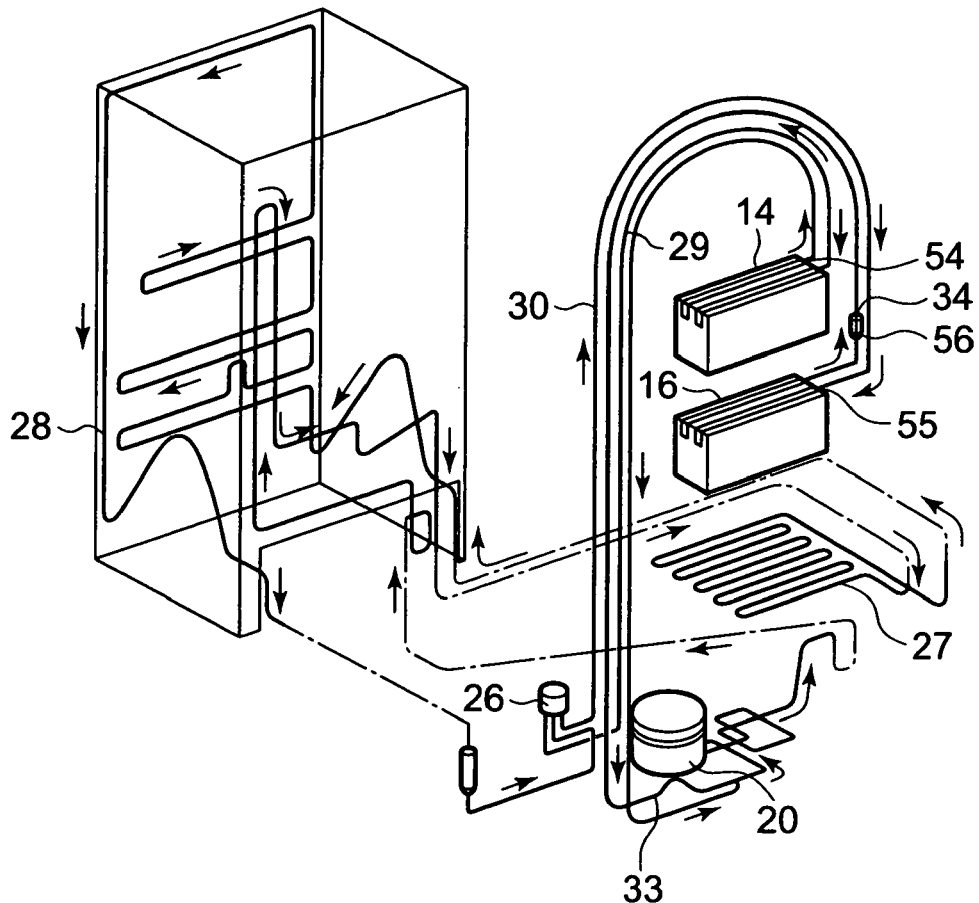
FIG. 8 is an illustration for a refrigerating cycle showing an embodiment of the present invention.

On the other hand, as shown in FIG. 8, in the refrigerating cycle, the compressor 20, a condensation-proof pipe 28, the condenser 27, and the selection valve 26 for switching the flow of refrigerant and performing the fully closing and opening operation are connected in series, and the first connection pipe connecting the R capillary tube 29 and the R evaporator 14 and the second connection pipe connecting the F capillary tube 30, the F evaporator 16, the accumulator 34, and the check valve 33 are connected in parallel. The combustible cooling medium (for example, HC cooling medium) is used as the refrigerant.

In the aforementioned constitution, by detection signals of an R sensor 50 and an F sensor 51 for respectively detecting the room temperatures of the cold storage chamber 2 and the freezing chamber 5, the F flow for supplying the refrigerant to the second connection pipe connecting the F capillary tube 30, the F evaporator 16, the accumulator 34, and the check valve 33 and the R flow for supplying the refrigerant to the first connection pipe connecting the R capillary tube 29 and the R evaporator 14 are alternately switched by operating the selection valve 26 so as to cool the cold storage temperature zone and the freezing temperature zone.

Further, on the pipe on the outlet side of the R evaporator 14, an R evaporator sensor 54 for detecting the temperature of the R evaporator 14 is installed. On the pipe on the inlet side of the F evaporator 16, an inlet temperature sensor 55 for detecting the temperature of the inlet pipe is installed. Further, on the accumulator 34, an outlet temperature sensor 56 for detecting the temperature of the pipe on the outlet side of the F evaporator 16 is installed. By detection signals of the R evaporator sensor 54 and the outlet temperature sensor 56, the defrosting running of the R evaporator 14 and the F evaporator 16 started in accordance with the cumulative time of running of the compressor 20 is stopped.

Figure 10:
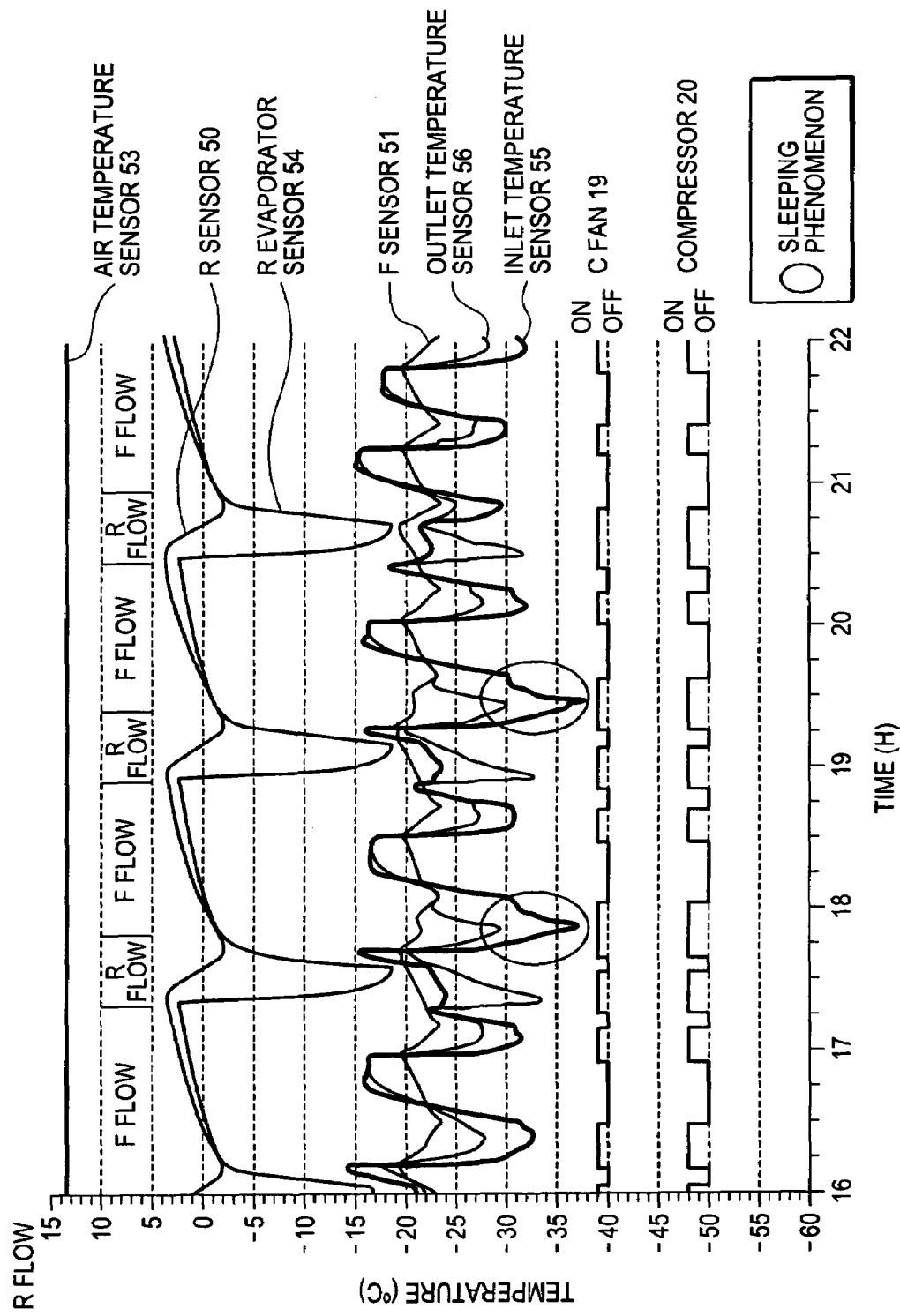
FIG. 10 is a graph showing temperature changes in the refrigerant sleeping state.

Next, the sleeping phenomenon generated when the temperatures of the machine room and the installation room are different from each other will be explained. In FIG. 10, the temperature changes are shown in the following conditions. The air temperature sensor 53 is attached to an operation board 61. During the normal cooling running, the room temperature is set to 5° C., that is, the temperature in the neighborhood of the machine room 22 is set to 5° C. The operation board 61 is covered with a heat insulating substance so that the detection temperature by the air temperature sensor 53 is increased to 10° C. or higher. Thus a difference is generated between the detection temperature of the air temperature sensor 53 and the actual temperature of the machine room 22 and the temperature changes are measured.

Further, when the detection temperature of the R sensor 50 is lowering, the R flow is executed, and when it is rising, the F flow is executed. The air temperature sensor 53 detects 13.5° C., so that the temperature is regarded as medium, and the R flow and the F flow are executed in synchronization with the compressor 20.

In this case, when the F flow is executed, that is, when the refrigerant is flowing through the F evaporator 16, if the compressor 20 and the C fan 19 are driven, a temperature difference is generated between the outlet and the inlet of the F evaporator 16 and the temperature on the outlet side becomes higher than the temperature on the inlet side.

The reason is that in general, when the refrigerant of the appropriate amount is flowing through the evaporator, the refrigerant continuously evaporates up to the outlet side, so that a large temperature difference is not generated between the outlet side and the inlet side. While when the amount of the circulating refrigerant is little, the refrigerant finishes its evaporation before it reaches the outlet side, so that the amount thereof becomes insufficient and a large temperature difference is generated between the outlet side and the inlet side.

Namely, the factors of generation of a temperature difference between the outlet side and the inlet side of the evaporator are considered to be an insufficient amount of charged refrigerant or the refrigerant leakage. These are caused by a manufacture mistake or an accident, and must be repaired separately. But, according to the present invention, it is regarded that the compressor and others are in a low temperature state, thus the refrigerant sleeping phenomenon is generated, so that the amount of the circulating refrigerant is reduced. In such a state, the C fan is stopped and the compressor and others are prevented from overcooling.

Figure 5:
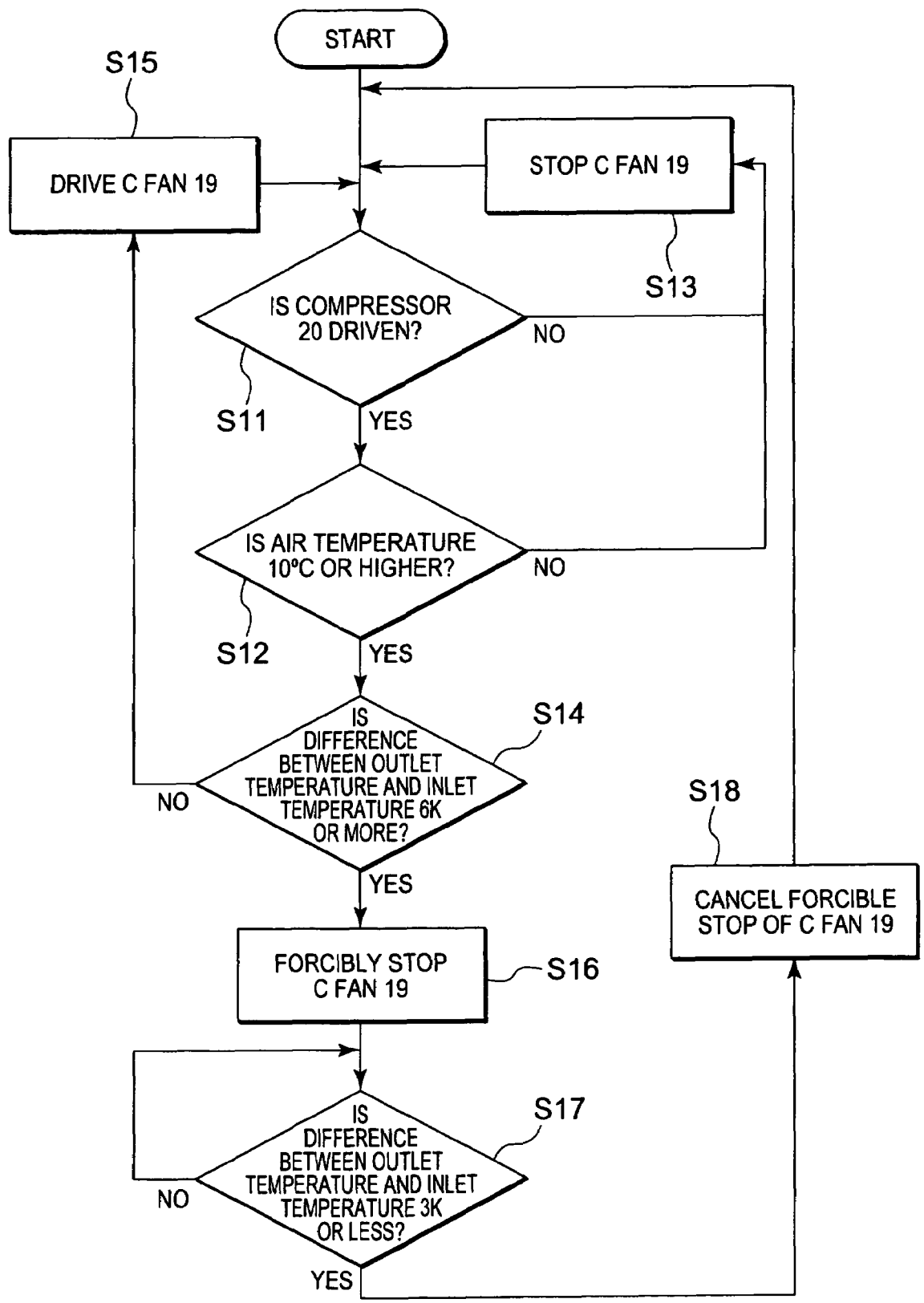
FIG. 5 is a flow chart showing a third embodiment of the present invention.

Control of the prevention of the C fan from the refrigerant sleeping which is the third embodiment of the present invention will be explained on the basis of the flow chart shown in FIG. 5.

At a Step S11, whether the compressor 20 is driven or not is judged. When the compressor 20 is not driven, the compressor 20 and the condenser 27 (hereinafter, referred to as the compressor and others) are not at high temperature, so that there is no need to cool them, and the process goes to a step S13, and the C fan 19 is put into a stop state. When the compressor 20 is driven, the process judges that the cooling is necessary and goes to a step S12.

At the step S12, whether the air temperature detected by the air temperature sensor 53 is low, in this case, 10° C. or lower is judged. When the air temperature is 10° C. or lower, that is, it is low, so that even if the compressor 20 is driven, the refrigerant sleeping is generated by the rotation of the C fan 19. Therefore, the process goes to the step S13, and the C fan 19 is put into the stop state. When the air temperature is higher than 10° C., the process judges that the cooling of the compressor and others is necessary and goes to a step S14.

At the step S14, whether the detection temperature of the outlet temperature sensor 56 is higher than the detection temperature of the inlet temperature sensor 55 by a predetermined value or more, in this case, 6 K or more is judged. At this time, when the temperature on the outlet side is not increased, the refrigerant is appropriately evaporated in the evaporator and the refrigerant sleeping is not generated, so that the process judges that the cooling of the compressor and others is necessary, goes to a step S15, and drives the C fan 19. Further, when the temperature on the outlet side is higher by 6 K or more, the amount of the circulating refrigerant is little and the refrigerant is not evaporated appropriately up to the outlet side of the evaporator, so that the process judges that the compressor and others are in an overcooled state and the refrigerant sleeping is generated, goes to a step S16, and forcibly stops the C fan 19.

And, at a step S17, when a difference between the detection temperature of the outlet temperature sensor 56 and the detection temperature of the inlet temperature sensor 55 does not become a predetermined value or less, in this case, 3 K or less, the process judges that the compressor and others are in an overcooled state and forcibly keeps the C fan 19 in the stop state, while when it becomes 3 K or less, the process judges that the compressor and others are returned to the normal state, goes to a step S18, cancels the forcible stop state of the C fan 19, and returns to the initial state.

As explained above, the control of the C fan, even if the drive conditions of the C fan such as the driving of the compressor and the air temperature condition are realized, judges whether the refrigerant is sleeping in the compressor and the condenser and then drives the C fan. Therefore, the compressor and condenser are not overcooled, and the defective cooling due to the refrigerant sleeping can be prevented.

Further, the unnecessary driving of the C fan can be eliminated, so that the energy conservation effect can be improved.

Furthermore, even when a difference is generated between the temperatures of the installation room and the machine room at the time of the installation or in winter, since the air temperature sensor is attached to the back of the cover 24, the temperature of the air taken in the machine room 22 can be detected accurately, thus the overcooling of the compressor and others due to the driving of the C fan can be prevented.

Figure 6:
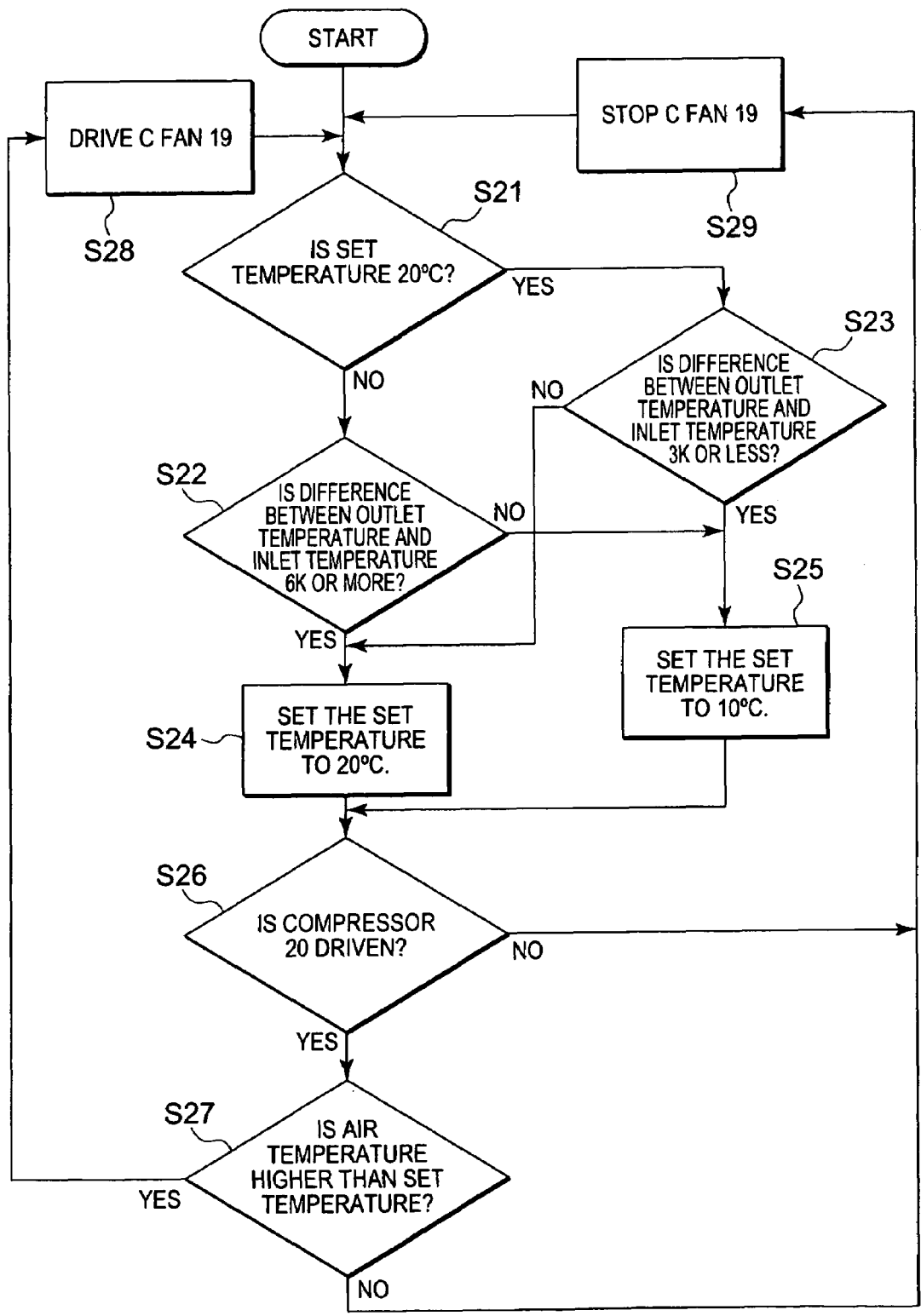
FIG. 6 is a flow chart showing a fourth embodiment of the present invention.

Next, the control of the prevention of the C fan from the refrigerant sleeping which is the fourth embodiment of the present invention will be explained on the basis of the flow chart shown in FIG. 6.

At a step S21, whether the set temperature of the air which is a stop condition of the C fan 19 is set to a medium temperature, in this case, 20° C. is judged. In the initial state, when the air temperature is low, it is set to 10° C. When the stop condition of the C fan 19 is set to 10° C., the process goes to a step S22 and when the stop condition is set to 20° C., the process goes to a step S23.

At the step S22, whether the detection temperature of the outlet temperature sensor 56 is higher than the detection temperature of the inlet temperature sensor 55 by a predetermined value or more, in this case, 6 K or more is judged.

At this time, when the temperature on the outlet side is not increased, the refrigerant is appropriately evaporated in the evaporator and the refrigerant sleeping is not generated, so that it is judged that cooling of the compressor and others is necessary at the medium temperature, and at a step S25, the air temperature of the stop condition of the C fan 19 is set to 10° C.

Further, when the temperature difference between on the inlet and outlet sides is 6 K or more, the refrigerant circulation amount is little and the refrigerant is not evaporated appropriately up to the outlet side of the evaporator, so that it is judged that the compressor and others are overcooled even at the medium temperature and the refrigerant sleeping is generated, and the process goes to a step S24. Here the stop condition of the C fan 19 is set to an air temperature of 20° C. so that the C fan 19 is not at a high temperature the C fan 19 is not driven.

And, when the air temperature to be set is decided, the process goes to a step S26 and judges whether the compressor 20 is driven or not. When the compressor 20 is not driven, the compressor and others will not become at a high temperature regardless of the air temperature and do need to be cooled, and then the process goes to a step S29 and puts the fan into the stop state. When the compressor 20 is driven, the process judges that the cooling is necessary and goes to a step S27.

At the step S27, whether the air temperature detected by the air temperature sensor 52 is higher or not is judged as compared with the temperatures set at the steps S24 and S25

For example, when the set temperature is set to 20° C. at the step S24 and the detected air temperature is a medium temperature of 16° C., since the air temperature is lower than the set temperature, even when the air temperature is medium and the compressor 20 is driven, if the C fan 19 is rotated, there is a possibility of the generation of the refrigerant sleeping, so that the process goes to a step S29 and puts the C fan 19 into the stop state.

When the air temperature is higher than 20° C. inversely, even if the temperature difference between at the outlet and inlet of the evaporator 16 is large, the process judges that the compressor and others must be cooled, goes to a step S28, and drives the C fan 19.

The reason is that when a cold air leak is generated due to an improperly closed door, a phenomenon is generated that the temperature difference between the outlet and the inlet of the evaporator is increased in the same way as with the refrigerant sleeping. If this occurs, the compressor and others must be cooled so as to increase the cooling power, and when the air temperature is high, wherein there is no possibility of the generation of the refrigerant sleeping, the compressor and others are prevented from defective cooling.

On the other hand, even if the set temperature is set to 20° C. once at the step S24, if no hysteresis is set, the control becomes complicated due to a minute temperature change. Therefore, when it is judged that the set temperature is set to 20° C. at the step S21, if the inlet temperature of the evaporator is not lower than the outlet temperature by 3 K or less, the process goes to the step S24, keeps the set temperature of 20° C. While when the inlet temperature is lower by 3 K or more, the process judges that there is no possibility of the generation of the refrigerant sleeping, goes to the step S25, and switches the setting temperature to 10° C.

By use of the aforementioned constitution, when the air temperature is high, wherein there are few refrigerant sleeping phenomena generated, even if a temperature difference is generated between the outlet and the inlet of the evaporator, it is judged to be affected by the cold air leak, and the C fan is returned to the normal running. When the air temperature is medium, wherein there is a possibility of the generation of the refrigerant sleeping phenomenon, the C fan is controlled in correspondence with the refrigerant sleeping phenomenon. When the air temperature is low, wherein there are many refrigerant sleeping phenomena generated, the C fan is stopped. Therefore, the compressor and the condenser can be effectively cooled along each temperature zone, thus the cooling capacity can be improved.

On the other hand, the C fan control according to the present invention is particularly effective in a case where the refrigerant to be charged in a small amount such as a combustible cooling medium is used, and the defective cooling due to the refrigerant sleeping can be prevented.

Further, in the aforementioned constitution, by the temperature sensors installed at the outlet and inlet of the F evaporator the refrigerant sleeping is detected. However, temperature sensors may also be installed respectively at the outlet and inlet of the R evaporator so as to detect the refrigerant sleeping.

Further, the set temperature and the temperature difference between at the outlet and the inlet of the F evaporator for detecting the refrigerant sleeping phenomenon vary with the refrigerating cycle and the capacity of the refrigerator, and needless to say, they are properly set to optimum temperatures.

Further, the operation and stop conditions of the C fan are not limited to those described above. The conditions may be combined with various conditions, such as during R flow, F flow and defrosting and the door switch. Particularly, the C fan is effectively stopped for a predetermined period of time at the time of turning on power and at the time of starting the compressor, wherein the refrigerant sleeping is easily generated.

Furthermore, the air temperature sensor is attached to the cover. However, the present invention is not limited to this. The air temperature sensor may be installed in a place free of temperature effect of the compressor in the neighborhood of the machine room, such as on the rear cover or bottom plate. When the air temperature sensor is to be installed in the duct where the condenser is arranged, it may be arranged on the downstream side of the refrigerant, or the condenser may be deformed, so as to avoid the effect of the temperature of the condenser, if possible.

As many apparently widely different embodiments of this invention may be made without departing from the spirit and scope thereof, it is to be understood that the invention is not limited to the specific embodiments thereof except as defined in the appended claims.

INDUSTRIAL APPLICABILITY

According to a refrigerator of the present invention, even if a hydrocarbon cooling medium which is charged in a small amount and particularly soluble in refrigeration machine oil is used, the initial cooling performance after turning on power can be improved. Furthermore, defective cooling due to the sleeping of a refrigerant staying in the compressor or condenser can be prevented.

As described above, the refrigerator according to this invention is widely usable for the household refrigerators.

The invention clamed is:

1. A refrigerator system using a hydrocarbon-based cooling medium, the system comprising:
   a compressor, a condenser, and at least one evaporator operatively coupled together and containing the hydrocarbon-based cooling medium and a machine oil therein;
   a cooling fan arranged to cool said compressor; and
   a controller configured to:
   operate said compressor at an operational speed;
   control an ON/OFF state of said cooling fan;
   evaluate an air temperature of an environment in which the refrigerator system is arranged and, responsive to a determination that the air temperature is less than a first temperature, stop the cooling fan; and
   responsive to a determination that the air temperature is equal to or greater than the first temperature and that a temperature difference between an inlet and an outlet of said at least one evaporator is less than a predetermined value, start said cooling fan,
   wherein said control of the ON/OFF state of said cooling fan operates to heat the hydrocarbon-based cooling medium at least to a temperature that reduces an amount of the hydrocarbon-based cooling medium dissolved in the machine oil at least to a level that reduces a sleeping phenomenon of the hydrocarbon-based cooling medium.

2. The refrigerator system of claim 1, wherein said controller is further configured to cancel a forced OFF state of said cooling fan in response to a determination that said temperature difference is less than or equal to a second predetermined value.

3. The refrigerator system of claim 1, wherein said at least one evaporator comprises two evaporators arranged in parallel with each other, a first evaporator for a refrigerator compartment, and a second evaporator for a freezer compartment.

4. The refrigerator system of claim 3, further comprising a selection valve controlled by the controller and arranged between the condenser and the first and second parallel evaporators.

5. The refrigerator system of claim 1, wherein said hydrocarbon-based cooling medium comprises a combustible cooling medium.

* * * * *